US012588093B2

(12) United States Patent
Liu et al.

(10) Patent No.: US 12,588,093 B2
(45) Date of Patent: Mar. 24, 2026

(54) SMALL DATA TRANSMISSION

(71) Applicant: ZTE CORPORATION, Shenzhen (CN)

(72) Inventors: Yu Liu, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 450 days.

(21) Appl. No.: 18/114,382

(22) Filed: Feb. 27, 2023

(65) Prior Publication Data

US 2023/0224998 A1     Jul. 13, 2023

Related U.S. Application Data

(63) Continuation of application No. PCT/CN2020/122741, filed on Oct. 22, 2020.

(51) Int. Cl.
| | |
|---|---|
| *H04W 76/20* | (2018.01) |
| *H04W 72/1273* | (2023.01) |
| *H04W 72/23* | (2023.01) |
| *H04W 76/30* | (2018.01) |
| *H04W 74/0833* | (2024.01) |
| *H04W 74/0836* | (2024.01) |

(52) U.S. Cl.
CPC ....... *H04W 76/20* (2018.02); *H04W 72/1273* (2013.01); *H04W 72/23* (2023.01); *H04W 76/30* (2018.02); *H04W 74/0833* (2013.01); *H04W 74/0836* (2024.01)

(58) Field of Classification Search
CPC ..... H04W 76/20; H04W 76/30; H04W 72/23; H04W 72/1273; H04W 74/0836; H04W 74/0833
See application file for complete search history.

(56) References Cited

U.S. PATENT DOCUMENTS

| | | | | |
|---|---|---|---|---|
| 2012/0281566 A1* | 11/2012 | Pelletier | ................ | H04W 76/27 |
| | | | | 370/252 |
| 2015/0236985 A1* | 8/2015 | Chandramouli | .... | H04L 49/9057 |
| | | | | 370/328 |
| 2018/0376422 A1* | 12/2018 | Shu | ................... | H04W 52/0235 |
| 2019/0141776 A1* | 5/2019 | Kim | ...................... | H04W 76/20 |

(Continued)

FOREIGN PATENT DOCUMENTS

| | | |
|---|---|---|
| CN | 106793170 | 5/2017 |
| CN | 107889274 | 4/2018 |

(Continued)

OTHER PUBLICATIONS

Huawei et al. "Small data transmission with RA-based schemes," 3GPP TSG-RAN WG2 Meeting #111-e, R2-2006583, Aug. 2020, 8 pages.

(Continued)

*Primary Examiner* — Jael M Ulysse
(74) *Attorney, Agent, or Firm* — Crowell & Moring LLP

(57) ABSTRACT

Method, systems and devices for small data transmissions can occur with user equipment even when the user equipment is in an inactive state. Small data transmissions while in an inactive state can save power and reduce signaling overhead. The small data transmissions may be prepared with small data transmission parameters. A small data transmission indication is included in a reply to user equipment that requests small data transmission communication.

10 Claims, 17 Drawing Sheets

(56) References Cited

U.S. PATENT DOCUMENTS

| | | | |
|---|---|---|---|
| 2020/0146069 A1* | 5/2020 | Chen | H04B 17/327 |
| 2020/0367310 A1* | 11/2020 | Jung | H04W 76/15 |
| 2021/0014899 A1* | 1/2021 | Shih | H04W 74/0833 |
| 2021/0274525 A1* | 9/2021 | Wei | H04W 76/27 |
| 2021/0315049 A1* | 10/2021 | Wei | H04W 76/27 |
| 2021/0329559 A1 | 10/2021 | Huang et al. | |
| 2021/0337625 A1* | 10/2021 | Tsai | H04W 76/30 |
| 2022/0086899 A1* | 3/2022 | Shih | H04L 5/0053 |
| 2022/0086946 A1* | 3/2022 | Huang | H04W 72/23 |
| 2022/0095409 A1* | 3/2022 | Agiwal | H04W 76/27 |
| 2022/0225472 A1* | 7/2022 | Kim | H04W 12/106 |
| 2022/0232659 A1* | 7/2022 | Kim | H04W 76/28 |
| 2023/0083841 A1* | 3/2023 | Wei | H04W 76/36 |
| | | | 455/450 |
| 2023/0088082 A1* | 3/2023 | Lin | H04W 74/0836 |
| | | | 370/329 |
| 2023/0120407 A1 | 4/2023 | Huang | |
| 2023/0225005 A1* | 7/2023 | Park | H04W 76/30 |
| | | | 370/329 |
| 2023/0389081 A1* | 11/2023 | Singh | H04W 72/23 |
| 2024/0008133 A1* | 1/2024 | Shah | H04W 74/0833 |
| 2024/0179787 A1* | 5/2024 | Park | H04W 76/27 |

FOREIGN PATENT DOCUMENTS

| | | |
|---|---|---|
| CN | 108924829 | 11/2018 |
| CN | 108924964 | 11/2018 |
| CN | 110139365 | 8/2019 |
| CN | 110213799 | 9/2019 |
| CN | 110536385 | 12/2019 |
| CN | 110831258 | 2/2020 |
| EP | 3 620 021 | 3/2020 |
| WO | WO 2018/086600 | 5/2018 |

OTHER PUBLICATIONS

Extended European Search Report issued in European application No. 20958161.0, dated Nov. 4, 2024, 8 pages.

Extended European Search Report issued Aug. 7, 2023 in corresponding European Patent Application No. 20958161.0.

Qualcomm Incorporated: "RACH based NR Small Data Transmission", 3GPP Draft; R2-2007540, 3rd Generation Partnership Project (3GPP), Mobile Competence Centre; 650, Route Des Lucioles; F-06921 Sophia-Antipolis Cedex; France vol. RAN WG2, No. Online; Aug. 17, 2018-Aug. 28, 2020, Aug. 7, 2020 (Aug. 7, 2020).

Intel Corporation: "SDT Mechanism on RRC/non-RRC Based Approaches and RACH Requirements", 3GPP Draft; R2-2006713, 3rd Generation Partnership Project (3GPP), Mobile Competence Centre; 650, Route Des Lucioles; F-06921 Sophia-Antipolis Cedex; France, vol. RAN WG2, No. Electronic Meeting; Aug. 17, 2020-Aug. 28, 2020 Aug. 7, 2020 (Aug. 7, 2020).

Huawei et al: "Common Aspects Between RACH and CG-Based Scheme", 3GPP Draft; R2-2006582, 3rd Generation Partnership Project (3GPP), Mobile Competence Centre; 650, Route Des Lucioles; F-06921 Sophia-Antipolis Cedex; France, vol. RAN WG2, No. Electronic; Aug. 17, 2020-Aug. 28, 2020 Aug. 7, 2020 (Aug. 7, 2020).

Qualcomm Incorporated: "RACH Based Uplink Small Data Transmission With or Without Anchor Relocation", 3GPP Draft; R2-2007541, 3rd Generation Partnership Project (3GPP), Mobile Competence Centre; 650, Route Des Lucioles; F-06921 Sophia-Antipolis Cedex; France, vol. RAN WG2, No. Online; Aug. 17, 2020-Aug. 28, 2020 Aug. 7, 2020 (Aug. 7, 2020).

International Search Report issued Jul. 14, 2021 in International (PCT) Application No. PCT/CN2020/122741.

ZTR Corporation: "Details of RRC-based IDT" 3GPP Draft; R2-2007449, 3rd Generation Partnership Project (3GPP), Mobile Competence Centre; 650, Route Des Lucioles; F-06921 Sophia-Antipolis Cedex; France, vol. RAN WG2, No. Electronic; Aug. 17, 2020-Aug. 28, 2020 Aug. 7, 2020 (Aug. 7, 2020).

OPPO, "Discussion on Efficient Small Data transmission in 'Inactive' State," 3GPP TSG-RAN WG2 Meeting #95bis, R2-166187, Oct. 14, 2016.

ZTE Corporation et al. "Configured grant based small datae transmission," 3GPP TSG-RAN WG2 #112e, R2-2009192, Nov. 13, 2019.

International Search Report and Written Opinion for International Application No. PCT/CN2020/096269, mailed on Feb. 25, 2021.

CATT, "Views on the Study of UE Power Saving and Wakeup Mechanism", 3GPP TSG-RAN #80, RP-180922, La Jolla, Jun. 11-14, 2018, 2 pages.

* cited by examiner

SMALL DATA TRANSMISSION

This application is a continuation application of PCT International Application No. PCT/CN2020/122741, filed with the China National Intellectual Property Administration, PRC on Oct. 22, 2020, which is herein incorporated by reference in its entirety.

TECHNICAL FIELD

This document is directed generally to wireless communications. More specifically, small data transmissions can occur even when a user equipment device is in an inactive state.

BACKGROUND

Wireless communication technologies are moving the world toward an increasingly connected and networked society. Wireless communications rely on efficient network resource management and allocation between user mobile stations and wireless access network nodes (including but not limited to wireless base stations). User mobile stations or user equipment (UE) are becoming more complex and the amount of data communicated continually increases. In order to improve communications and power usage, communication improvements should be made.

SUMMARY

This document relates to methods, systems, and devices for small data transmissions can occur with user equipment even when the user equipment is in an inactive state. Small data transmissions while in an inactive state can save power and reduce signaling overhead. The small data transmissions may be prepared with small data transmission parameters. A small data transmission indication is included in a reply to user equipment that requests small data transmission communication.

In one embodiment, a method for wireless communication includes receiving a request for a small data transmission during an inactive state, providing a small data transmission indication in response to the request, starting a timer, and processing the small data transmission. The small data transmission request may be from a user equipment device that is in the inactive state. The user equipment device receives the small data transmission indication in response to the request. The method includes configuring small data transmission parameters which configure small data transmission resources, wherein the small data transmission resources are released based on the small data transmission parameters upon entry of an idle or connected state for the user equipment device. The small data transmission parameters are configured via RRCReleasse with SuspendConfig. The processing the small data transmission includes scheduling a downlink data transmission or an uplink data transmission and restarting the timer upon the scheduling. Upon expiration of the timer, the user equipment device enters a state in which communication is prohibited. The small data transmission indication comprises a field in a radio resource control message. The small data transmission indication comprises a MAC control element. The small data transmission indication comprises a downlink control information (DCI) or a field as part of a DCI. The method includes providing a message for a change in state before the response provided.

In another embodiment, a method for wireless communication includes providing, while in an inactive state, a request for a small data transmission, starting a first timer after providing the request, receiving a small data transmission indication in response to the request, stopping the first timer and starting a second timer after receiving the indication, and processing the small data transmission. The small data transmission request is from a user equipment device that is in the inactive state. The user equipment device receives the small data transmission indication in response to the request. The method includes configuring small data transmission parameters, which configure small data transmission resources, wherein the small data transmission resources are released based on the small data transmission parameters upon entry of an idle or connected state for the user equipment device. The small data transmission parameters are configured via RRCReleasse with SuspendConfig. The processing the small data transmission includes scheduling a downlink data transmission or an uplink data transmission and restarting the second timer upon the scheduling. The method includes entering, upon expiration of the second timer, a state in which communication is prohibited. The first timer is started when the request is provided and an expiration of the first timer results in initiating a new small data transmission procedure or a connection resume procedure. The small data transmission indication comprises a field in a radio resource control message. The small data transmission indication comprises a MAC control element. The small data transmission indication comprises a downlink control information (DCI) or a field as part of a DCI. The request for the small data transmission is resubmitted if the response to the request is not received before the expiration of the first timer.

In another embodiment, a method for wireless communication includes establishing a threshold for selection between legacy random access (RA) resources and small data transmission (SDT) related RA resources, selecting, when a reference signals received power (RSRP) of a downlink pathloss reference is above the threshold, the SDT related RA resources, and selecting, when the RSRP of a downlink pathloss reference is below the threshold, the legacy RA resources. The method includes establishing another threshold for selection between two-step RA type and four-step RA type and selecting, when the RSRP of a downlink pathloss reference is above the another threshold, the two-step RA type.

In another embodiment, a method for wireless communication includes establishing a small data transmission (SDT) resources selection priority, wherein the SDT resources selection priority includes selecting firstly SDT related configured grant (CG) resources, selecting secondly SDT related random access (RA) resources, and selecting thirdly legacy RA resources. The SDT related RA resources comprise two-step RA and four-step RA, further wherein the resources selection priority comprises selecting the two-step RA before the four-step RA. The legacy RA resources comprise two-step RA and four-step RA, further wherein the resources selection priority comprises selecting the two-step RA before the four-step RA.

In another embodiment, a method for wireless communication includes receiving a request for a small data transmission during an inactive state at a first node basestation, determining that a second node basestation should receive the request, performing data forwarding between the first node basestation and the second node basestation, receiving a buffer status report (BSR), and performing anchor relocation when the BSR is above a threshold during small data transmission. The threshold limits an amount of data that can be transmitted.

In some embodiments, there is a wireless communications apparatus comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

DETAILED DESCRIPTION

Figure 1:
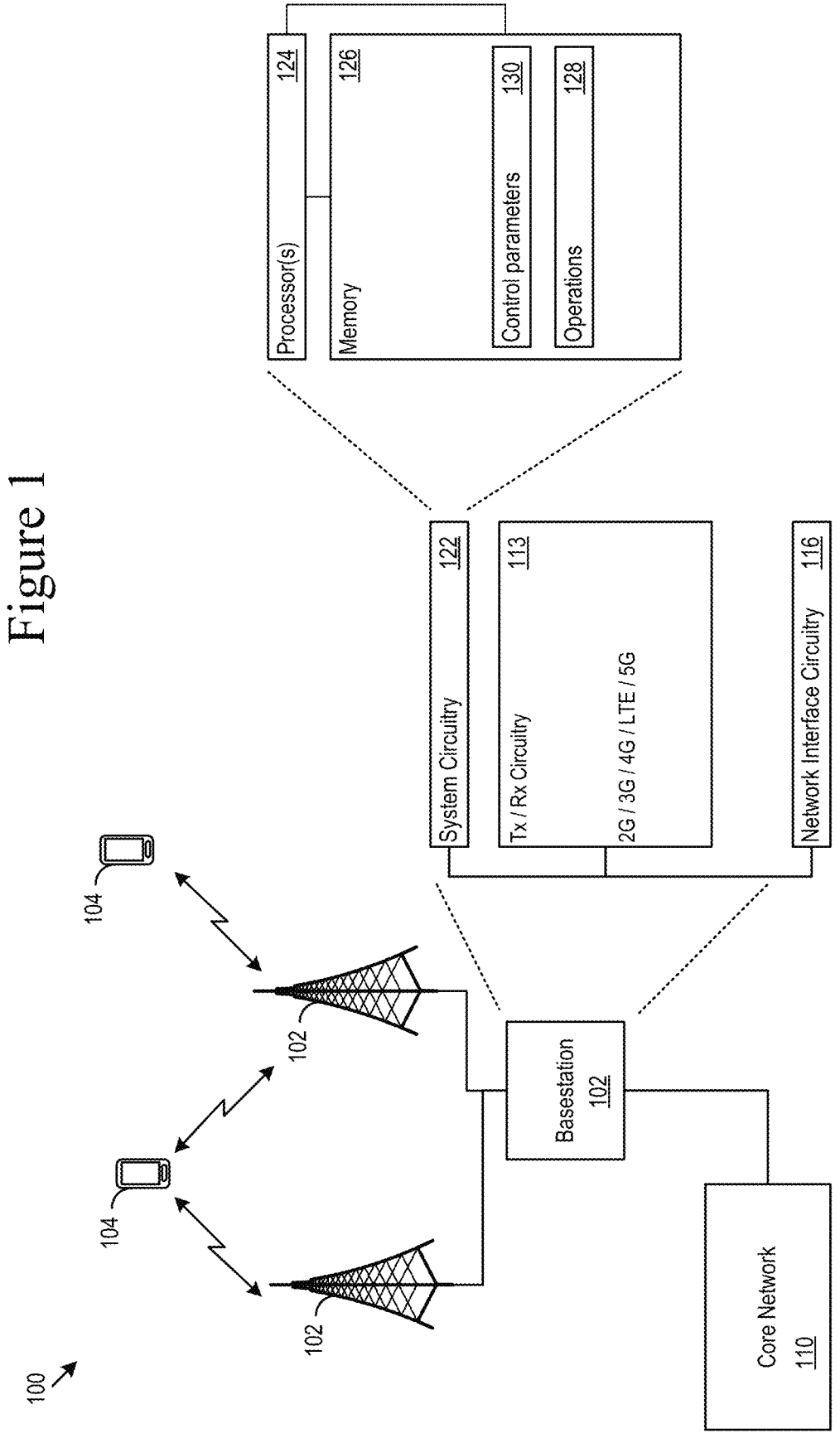
FIG. 1 shows an example basestation.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

In various telecommunications systems, such as a mobile telecommunications context, user equipment (UE) may communicate with a small data transmission (SDT). Traditionally, the transmission of user data is not allowed when in an inactive state. Even for the transmission of a very small amount of data the device has to resume the connection, which may have a negative impact on signaling overhead as well as device energy consumption. As described below, the transmission of small data payloads (i.e. SDT) may be made in an inactive state. For new radio (NR) specifications the UE may have three states: idle, inactive and connected. The UE cannot transmit data in idle and inactive, so when UE wants to transmit data in idle or inactive, the UE first transfers to connected. However, as described herein, for small data transmission (SDT), the UE can transmit small data in an inactive state, rather than transferring to connected first. The version of idle/inactive in which no data can be transferred may be referred to as the legacy state as compared with the states presented here that allow for small data transmission in inactive or idle states.

Any device that has intermittent small data packets in an inactive state can benefit from enabling small data transmission (SDT) while in an inactive state. SDT traffic may have different service requirements as compared to conventional or larger data transmission traffic types. SDT communication or data transfer may be made from/with the UE while in an inactive state. The UE may send an SDT request message to a basestation, which may be a nodeB (NB, e.g., an eNB or gNB) in a mobile telecommunications context. The basestation may respond to the UE request message with a reply that includes an SDT indication. The SDT indication signals that communication may be made from the UE even in an inactive state. Small data transmissions while in an inactive state can save power and reduce signaling overhead.

The SDT communications described herein can coexist with legacy mixed traffic on the same carrier, while improving usage of network resources (power, codes, interference, etc.) for the SDT communications. Examples of small and infrequent data traffic that would qualify for SDT include smartphone applications, such as 1) traffic from Instant Messaging services (e.g. WHATSAPP, QQ, WECHAT, etc.); 2) heart-beat/keep-alive traffic from IM/email clients and other apps; and 3) push notifications from various applications. In addition, other SDT may include traffic from wearables (periodic positioning information etc.), sensors (e.g. Industrial Wireless Sensor Networks transmitting temperature, pressure readings periodically or in an event triggered manner), and smart meters or smart meter networks sending periodic meter readings. In one embodiment, small data in SDT may include data with an application packets size of 100 bytes (upload UL or download DL) or lower. Although the examples and embodiments described herein refer to small data or small data transmission, the scope of small data may vary and may include data other than small data, such as normal data or large data. Specifically, the size of small data can vary and the embodiments/examples will apply to any data.

Radio resource control (RRC) is a protocol layer between UE and the basestation at the IP level (Network Layer). RRC messages are transported via the Packet Data Convergence Protocol (PDCP). As described, UE can transmit infrequent (periodic and/or non-periodic) data in RRC_INACTIVE state without moving to an RRC_CONECTED state. This can save the UE power consumption and signaling overhead. This can be through a Random Access Channel (RACH) protocol scheme or Configured Grant (CG) scheme. RACH is a shared channel used by wireless terminals to access the mobile network (TDMA/FDMA, and CDMA based network) for call set-up and data transmission. Whenever a UE wants to make a MO (Mobile Originating) call it schedules the RACH. RACH is a transport-layer channel, while the corresponding physical-layer channel is PRACH.

FIG. 1 shows an example basestation 102. The basestation may also be referred to as a wireless network node. The basestation 102 may be further identified to as a nodeB (NB, e.g., an eNB or gNB) in a mobile telecommunications context. The example basestation may include radio Tx/Rx circuitry 113 to receive and transmit with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

6

Figure 2:
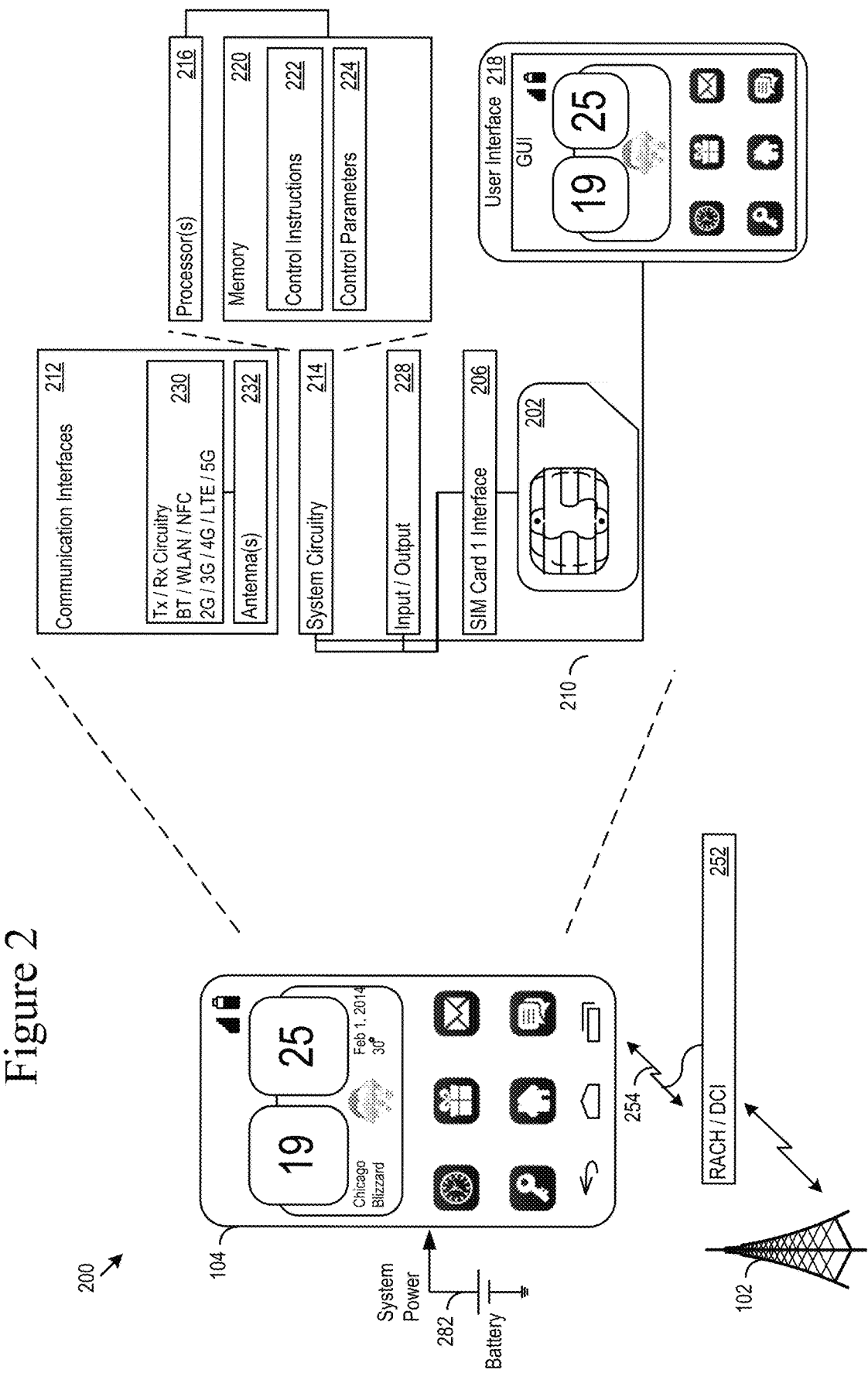
FIG. 2 shows an example random access (RA) messaging environment.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104. The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies.

Figure 3:
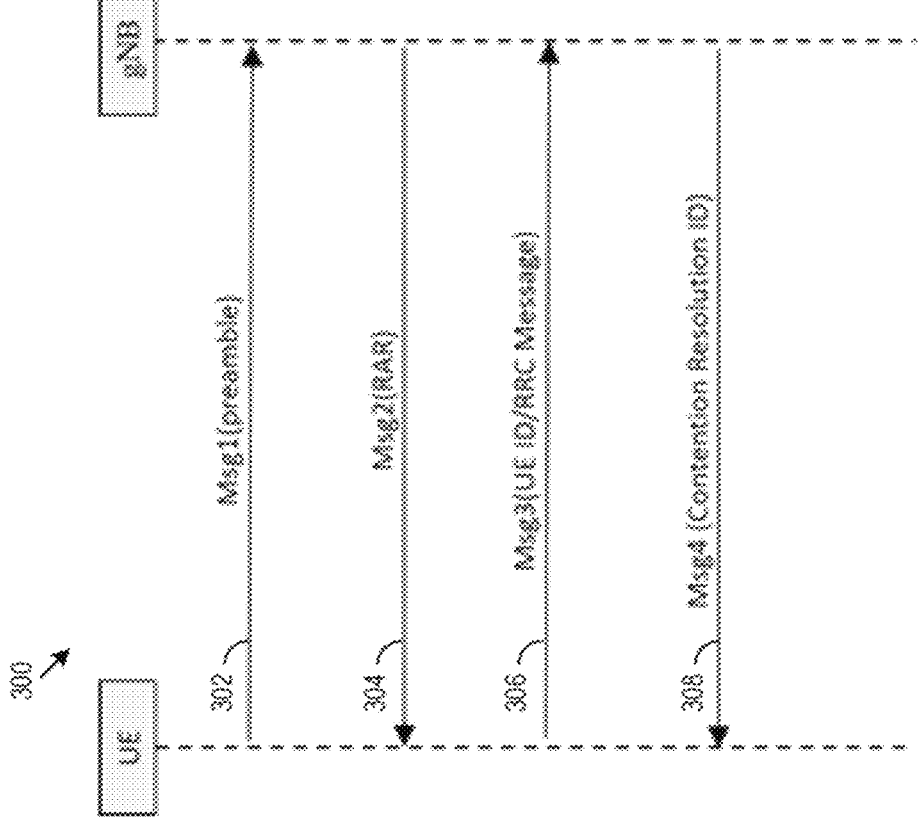
FIG. 3 shows example multiple step random access protocols.

FIG. 3 shows example multiple step random access protocols 300, 350. In various implementations, a UE and basestation (gNB) may engage in a multiple step protocol to: (i) UE send a preamble (e.g., in Msg1) to the base station (302), (ii) after reception of preamble, BS sends back a random access response (RAR)s (e.g., Msg2) to UE (304), (iii) UE sends back a third message (e.g., Msg3) on the upload UL grant indicated in the RAR containing the preamble transmitted in Msg1 (306), and (iv) after successfully decoding Msg3, a fourth message (e.g., Msg4) is transmitted from the basestation to the UE for performing contention resolution (308). This example four-step random access channel protocol 300 may allow for establishment of RRC connections and be referred to as 4-step RACH.

In some implementations, the latency created through the 4-step RACH protocol 300 may be decreased by using a two-step random access protocol 350 (e.g., 2-step RACH). The 2-step RACH 350 may combine (i) and (iii) and combine (ii) and (iv) to condense the RACH protocol into two steps. The first step is to send a first message, e.g. Msg1. In some examples the first message contains a preamble transmitted in physical random access channel and/or payload transmitted in physical uplink shared channel, which contains at least the same amount of information that is carried in Msg3 of 4-step RACH. A second message, e.g. Msg2 in respond to Msg1 is transmitted from BS to UE. Thus, the combination of the two UE messages allows for the combination of the two basestation messages. The example 2-step RACH may allow for reduced latency compared to the 4-step RACH, which may reduce channel occupancy times increase data available for payload transmission or have other technical benefits. Accordingly, implementing a 2-step RACH is a technical solution to a technical problem of increasing data network performance thereby improving the operation of the underlying hardware.

In various systems to implement a RACH protocol, and in some cases specifically a 2-step RACH, the architecture (e.g., the header/body structure of the messages and the fields therein) of the random access messages. Although in the examples discussed in this disclosure the architectures and techniques are used in the context of a reply message (e.g., Msg2) of a 2-step RACH, the architectures and techniques discussed herein may be applied to other random access messages where message architecture and content may be used to distinguish among message types. RACH is one example protocol for the communications discussed below for SDT during an inactive state. In other embodiments a Configured Grant (CG) scheme may be used for the SDT communications during the inactive state.

Figure 4:
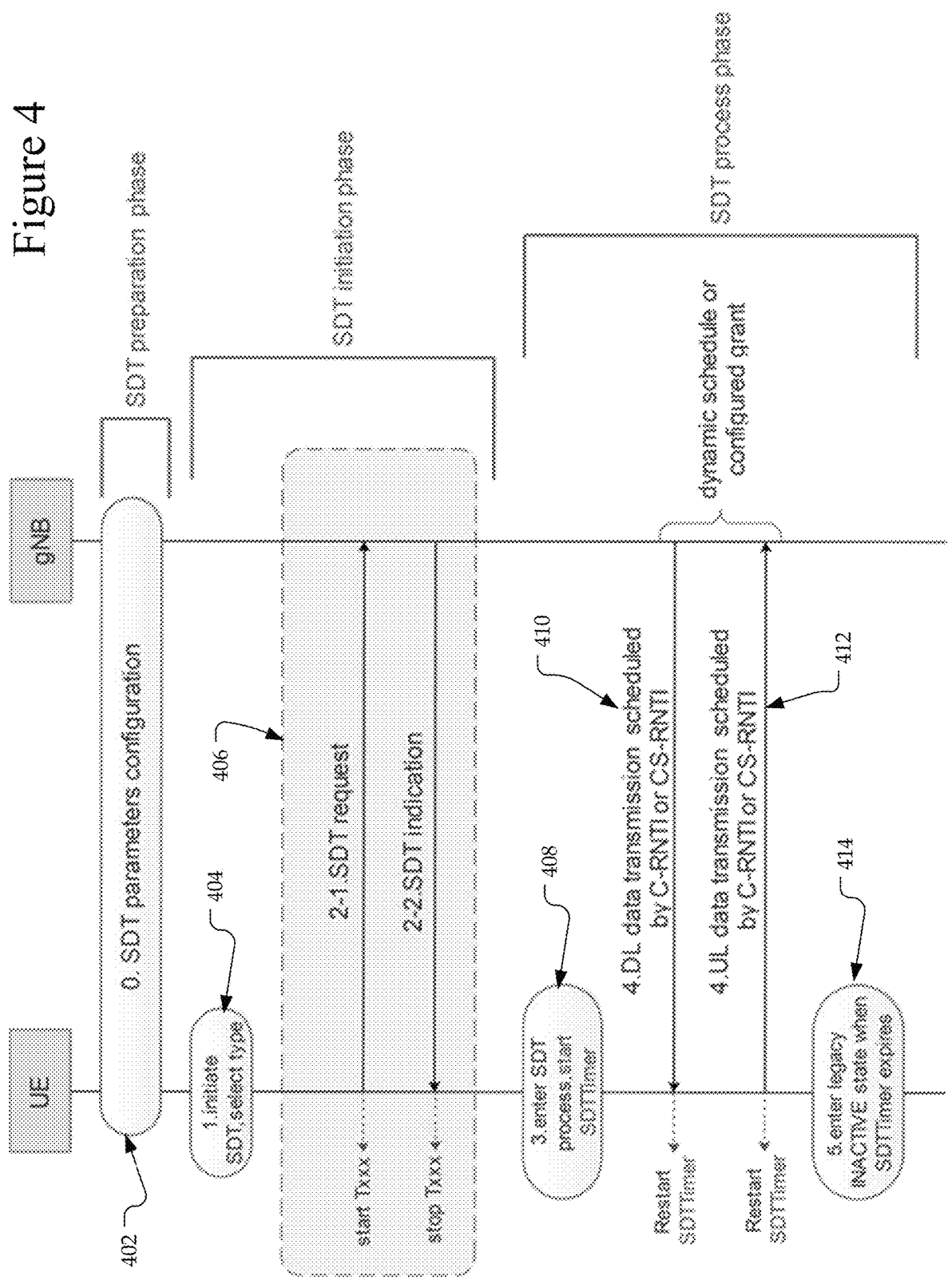
FIG. 4 shows one embodiment of a small data transmission (SDT) procedure.

FIG. 4 shows one embodiment of a small data transmission (SDT) procedure. FIG. 4 illustrates communications between the user equipment (UE) and a basestation (gNB). For SDT preparation, SDT parameters are configured 402 for the SDT preparation phase. Specifically, the network configures SDT parameters via RRC signaling as further described with respect to FIG. 6. SDT type selection 404 is part of the SDT initiation phase in which the UE initiates the SDT procedure after first selecting the SDT type as further described below with respect to FIG. 7. In block 406 a request for small data transmission (SDT) is made from the UE to the basestation gNB. In response, the basestation gNB provides a reply that includes an SDT indication. In this embodiment, a timer is started when the request is made and the timer is stopped when the reply with the SDT indication is received. In block 408, the SDT process is entered and an SDT timer is started. The SDT process includes the UE transmitting UL data using CG PUSCH resource or dynamic UL grant, and can receive DL data using dynamic DL assignment. Data transmission is scheduled to the UE 410 and is schedule from the UE 412. For each of the data transmission scheduling, the SDT timer is restarted. Specifically, the SDT timer is restarted when receiving downlink data or sending uplink data. In block 414, the UE can then enter the legacy inactive state (also referred to as normal inactive state) when the SDT timer expires. The legacy inactive state is the traditional inactive state when no data is transferred, however, as described herein, the modified inactive state can now allow for SDT even in the inactive state.

Figure 5:
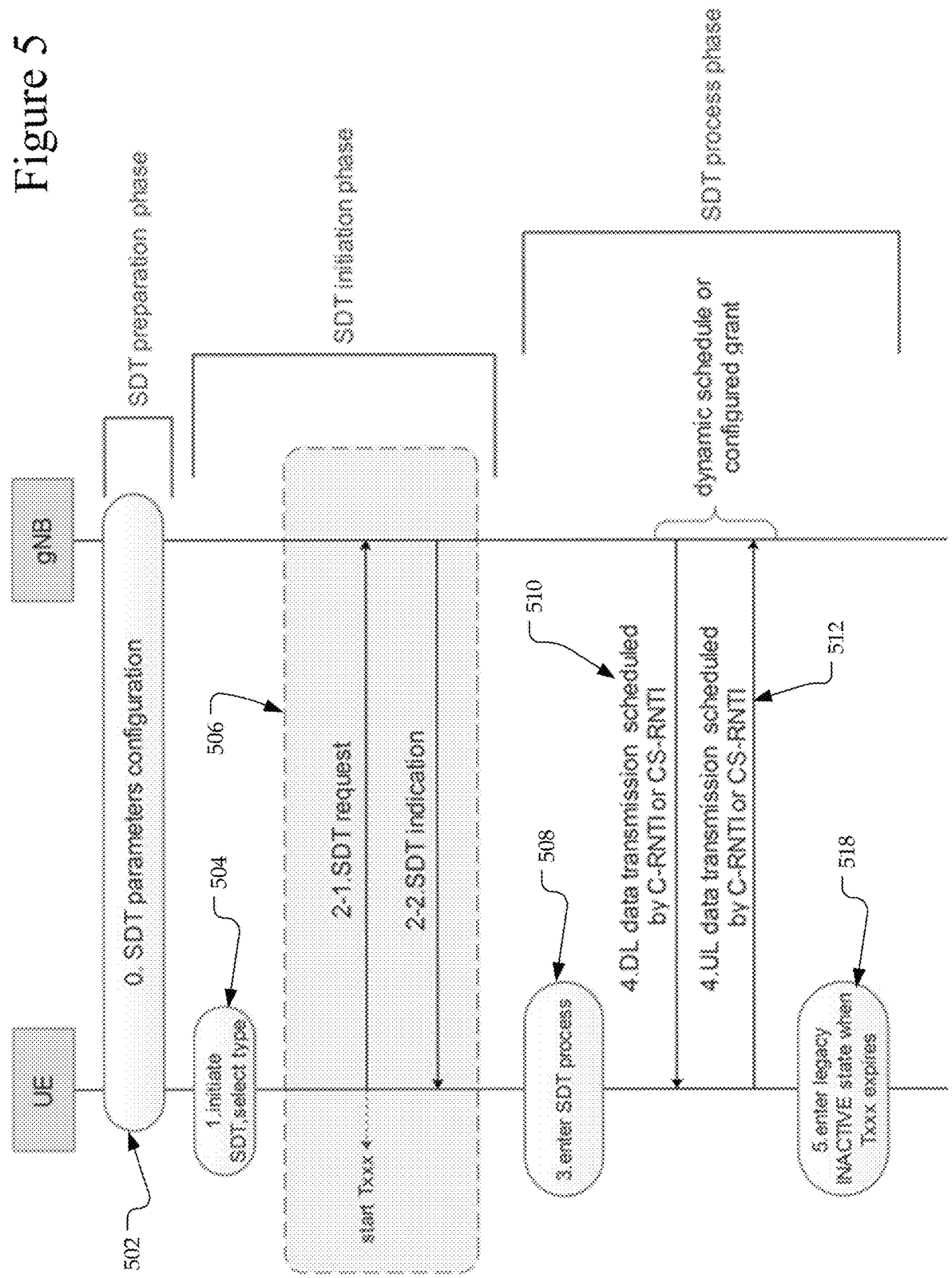
FIG. 5 shows another embodiment of a SDT procedure.

FIG. 5 shows another embodiment of a SDT procedure. While FIG. 4 illustrated two timers, the embodiment in FIG. 5 includes only one timer. For SDT preparation, SDT parameters are configured 502. The SDT parameter configuration 502 is further described with respect to FIG. 6. SDT type selection 504 is further described below with respect to FIG. 7. In block 506 a request for small data transmission (SDT) is made from the UE to the basestation gNB. In response, the basestation gNB provides a reply that includes an SDT indication. In this embodiment, the only timer is started when the request is made. In block 508, the SDT process is entered. Data transmission is scheduled to the UE 510 and is schedule from the UE 512. In block 514, the UE can then enter the legacy inactive state when the only timer expires. The legacy inactive state is the traditional inactive state where no data is transferred as compared with the modified inactive state that can now allow for SDT even in the inactive state.

Figure 6:
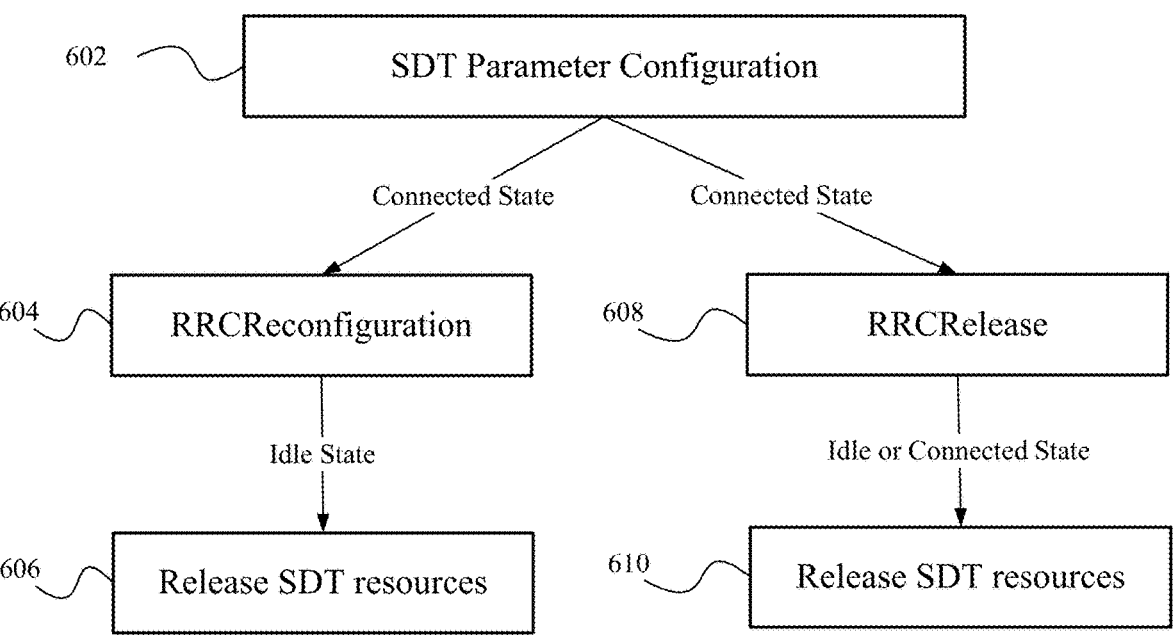
FIG. 6 shows an example flow for SDT parameter configuration.

FIG. 6 shows an example flow for SDT parameter configuration. SDT parameters are used in the SDT procedure (e.g. FIGS. 4a-4b). SDT parameters are about data and should be configured to be conducive to the characteristics of small data transmission. SDT parameters are UE specific and may include: ConfiguredGrantConfig(type1), PUSCH-Config, PDSCH-Config, ControlResourceSet, SearchSpace, DRX-config, etc. Networks take traffic characteristics of small data into account during configuring SDT parameters, such as configuring a little long Downlink Control Information (DCI) detection period for SearchSpace instead of per Transmission Time Interval (TTI) detection period, so as to save UE power consumption.

Specifically, FIG. 6 shows the SDT parameter configuration 602 with two options. In a first option, there would be a RRCReconfiguration 604 in which the network can configure SDT parameters via RRCReconfiguration in a CONNECTED state. In block 606, when the UE enters an IDLE state, the UE releases SDT resources configured by SDT parameters. In a second option, there would be a RRCRelease 608 with SuspendConfig. The network can configure SDT parameters via RRCRelease with SuspendConfig such that when UE enters IDLE or CONNECTED state, UE releases SDT resources configured by SDT parameters in block 610.

There may be a configuration for random access (RA) resources that includes different SDT parameters. For example, a separate configuration can be provided for normal RA and RA for data transmission in an inactive state, including the resource in time, frequency, power (e.g.

parameters related to power control), and/or code domain. Configuration for grant free transmission may include the resource for grant free transmission in time, frequency, power (e.g. parameters related to power control), and/or code domain. Indicator(s) can indicate whether the data transmission in power efficient state is supported and/or allowed. There may be configurations for the area scope that in which area the data transmission in power efficient state is allowed. The configurations for the selection between the data transmission after state transition and the data transmission in power efficient state without state transition, may include 1) for which logical channel and/or logical channel group and/or Dedicated Radio Bearer (DRB) and/or quality of service QoS flow and/or Protocol Data Unit (PDU) session, the data transmission in power efficient state without state transition is allowed; and 2) the buffer size threshold.

Figure 7:
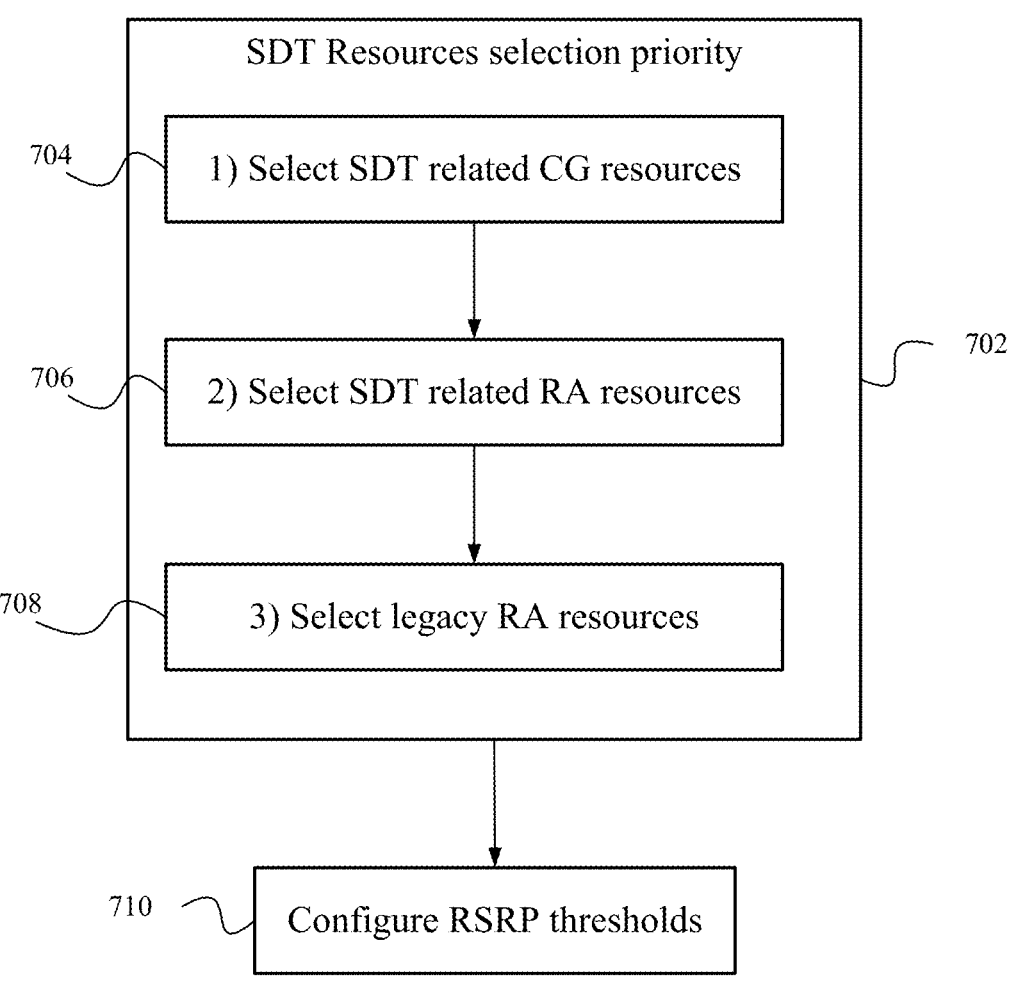
FIG. 7 shows an example flow for SDT type selection.

FIG. 7 shows an example flow for SDT type selection. In some embodiments, the SDT may be initiated with a RACH-based scheme and CG-based scheme. A RACH-based scheme can use legacy RA resources, or use SDT related random access (RA) resources. SDT resources may be assigned a selection priority 702. First priority is the selection of SDT related CG resources in block 704. Second priority is the selection of SDT related RA resources (e.g. 2-step RA, then 4-step RA) in block 706. Third priority is selecting legacy RA resources (e.g. 2-step RA, then 4-step RA) in block 708. In block 710, reference signals received power (RSRP) thresholds are configured.

In one embodiment, there may be three RSRP thresholds 710. In other embodiments there may be more or fewer thresholds and any subset or all of the thresholds can be used. A first threshold is for the selection between the normal uplink (NUL) carrier and the supplementary uplink (SUL) carrier. If the RSRP of the downlink pathloss reference is less than the first threshold, the UE will select the SUL carrier. A second threshold is for selection between 2-step RA type and 4-step RA type when both 2-step and 4-step Random Access type resources are configured in the UL bandwidth part (BWP). If the RSRP of the downlink pathloss reference is above the second threshold, the UE will select 2-step RA. A third RSRP threshold is used for selecting resources to initiate SDT. If the RSRP of the downlink pathloss reference is above the third RSRP threshold, the UE will select SDT related RA resources. Specifically, the third threshold establishes how to select resources to initiate SDT. In some embodiments, that selection may follow from when UE is configured NUL and SUL, or 2-step RA and 4-step RA.

In one example embodiment, the UE is configured NUL and SUL carrier and for one BWP, SDT related CG resources are configured in SUL, and not configured in NUL. Further, RA resources are configured in NUL and SUL, and the RSRP of the downlink pathloss reference is above the first threshold. In this example, if the UE selects the carrier first, the UE would select NUL and select RA resources. In other embodiments, due to SDT related CG resources being configured in SUL, UE can select SDT related CG resources first instead of selecting carrier first.

In another example embodiment, the UE is configured NUL and SUL carrier and for one BWP, SDT related CG resources are configured in NUL, and not configured in SUL. RA resources are configured in NUL and SUL, and the RSRP of the downlink pathloss reference is less than the first threshold. In this example, if the UE selects the carrier first, the UE would select SUL and select RA resources. In other embodiments, due to SDT related CG resources are configured in NUL, the UE can not select SDT related CG resources, because the UE's position is applicable to SUL carrier.

Referring back to FIGS. 4-5, the SDT initiation phase (404, 504) includes RACH-based and CG-based schemes, using either RRC-based or RRC-less embodiments. The SDT request can be RRC signaling or medium access control (MAC) control element (CE), and the SDT indication can be RRC signaling or MAC CE or DCI. FIGS. 8-13 illustrate SDT indication examples.

Figure 8:
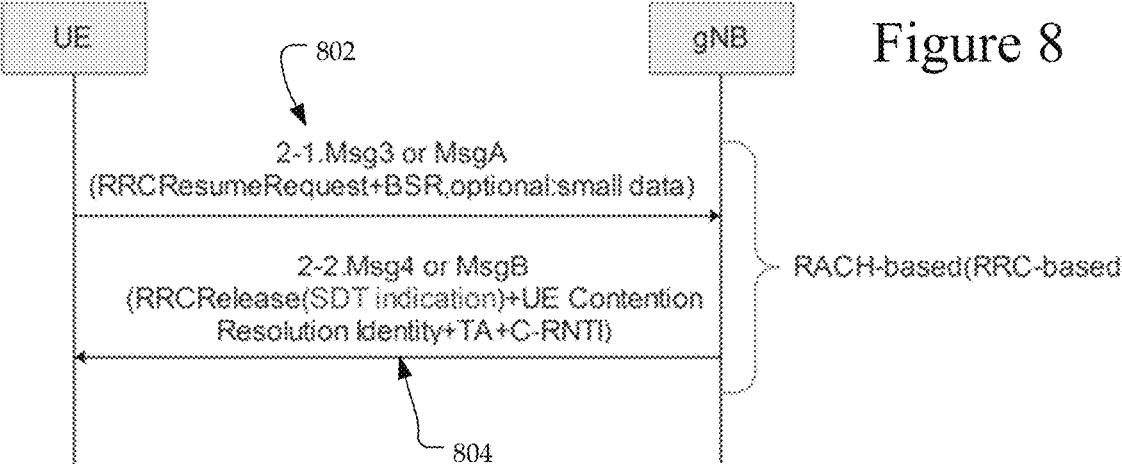
FIG. 8 shows an example of a RACH-based and RRC-based SDT indication.

FIG. 8 shows an example of a RACH-based and RRC-based SDT indication. The communication is with a RACH-based scheme and radio resource control (RRC) signaling. The UE issues a message 802 that may include an RRCResumeRequest to the basestation gNB. In response 804, the communication is modified to introduce a new field to the RRC message. Specifically, message 804 illustrates that RRCRelease includes an SDT indication field. This SDT indication is part of the reply by adding a new field to a legacy RRC message.

Figure 9:
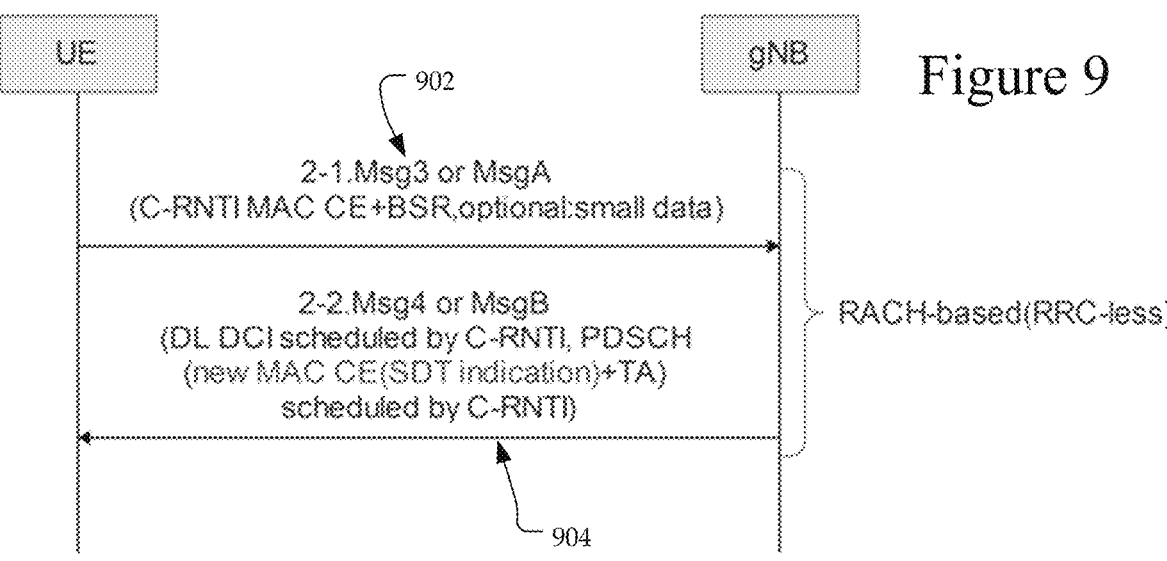
FIG. 9 shows an example of a RACH-based and MAC CE-based SDT indication.

FIG. 9 shows an example of a RACH-based and MAC control element (CE)-based SDT indication. The MAC control element (CE) communications are at the MAC layer. There may be a MAC structure for carrying the control information that is referred to as MAC CE. The UE issues a message 902 that may include C-RNTI to the basestation gNB. In response 904, the communication is modified to introduce a new field to the MAC CE message. Specifically, message 904 illustrates a PDSCH message that includes an SDT indication field. This SDT indication is part of the reply by adding a new field to a legacy MAC CE message.

Figure 10:
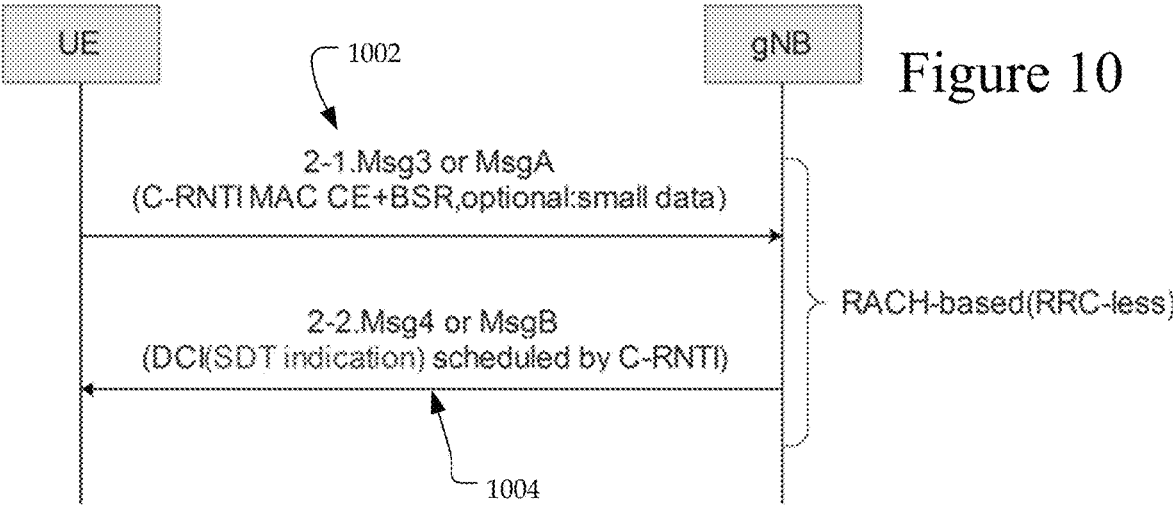
FIG. 10 shows an example of a RACH-based and DCI-based SDT indication.

FIG. 10 shows an example of a RACH-based and downlink control information (DCI)-based SDT indication. The UE issues a message 1002 that may include C-RNTI to the basestation gNB. In response 1004, the communication is modified to introduce a new field to a DCI message or to introduce a new DCI message. Specifically, message 1004 illustrates a DCI message that includes an SDT indication field. This SDT indication that is part of the reply may be in a new DCI message or may be a new field added to a legacy DCI message.

Figure 11:
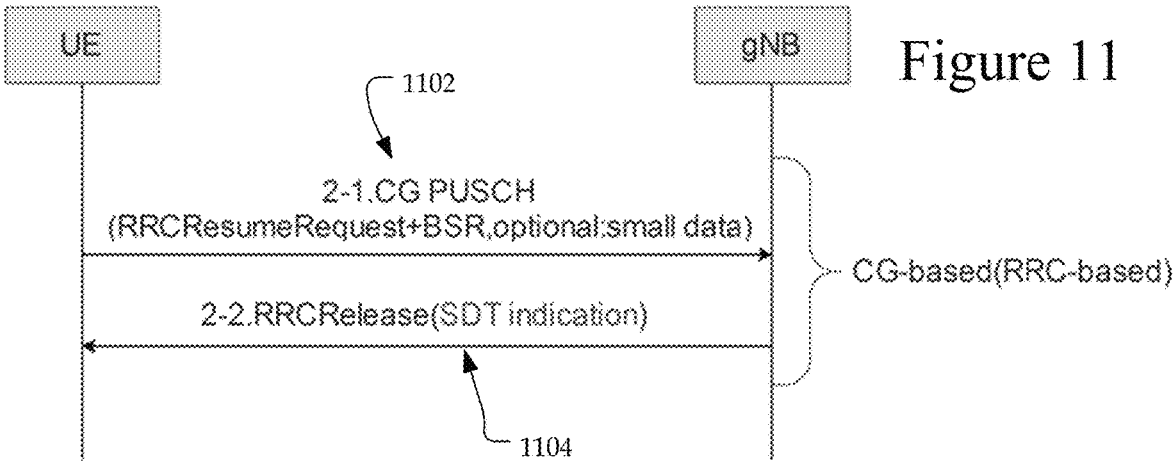
FIG. 11 shows an example of a CG-based and RRC-based SDT indication.

FIG. 11 shows an example of a CG-based and RRC-based SDT indication. The communication is through a configured grant (CG) scheme with RRC signaling. The UE issues a message 1102 that may include an RRCResumeRequest to the basestation gNB. In response 1104, the communication is modified to introduce a new field to the RRC message. Specifically, message 1104 illustrates that RRCRelease includes an SDT indication field. This SDT indication is part of the reply by adding a new field to a legacy RRC message.

Figure 12:
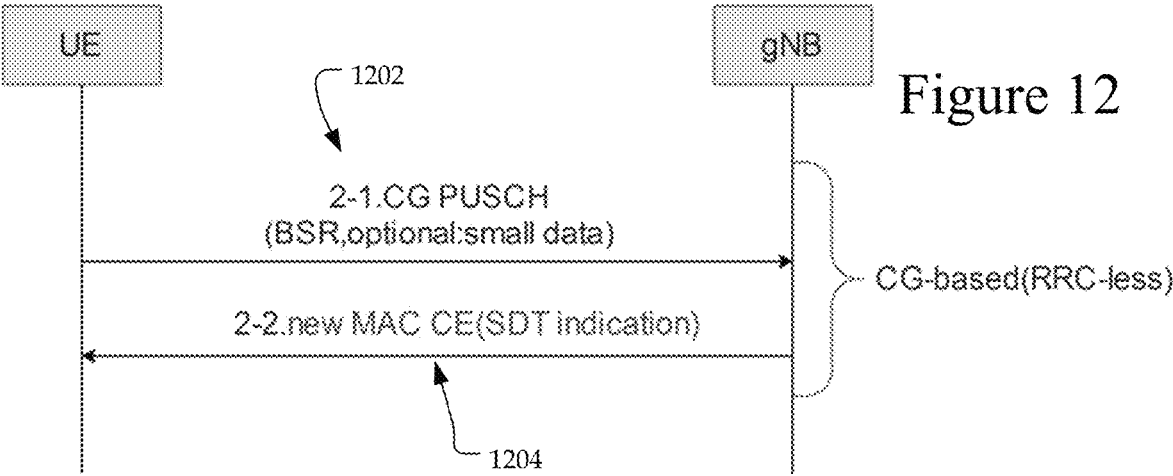
FIG. 12 shows an example of a CG-based and MAC CE-based SDT indication.

FIG. 12 shows an example of a CG-based and MAC CE-based SDT indication. The MAC control element (CE) communications are at the MAC layer. The UE issues a message 1202 that may include CG PUSCH to the basestation gNB. In response 1204, the communication is modified to introduce a new field to the MAC CE message. Specifically, message 1204 illustrates a new MAC CE message that includes an SDT indication field. This SDT indication is part of the reply by adding a new field to a legacy MAC CE message.

Figure 13:
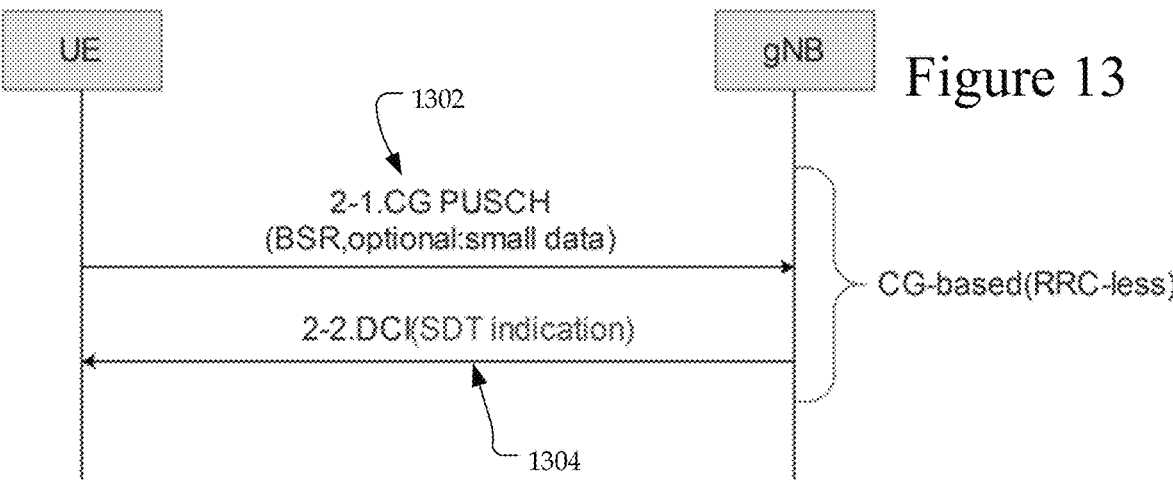
FIG. 13 shows an example of a CG-based and DCI-based SDT indication.

FIG. 13 shows an example of a CG-based and DCI-based SDT indication. The UE issues a message 1302 that may include CG PUSCH to the basestation gNB. In response 1304, the communication is modified to introduce a new field to the DCI message or to introduce a new DCI message. Specifically, message 1304 illustrates a DCI message that includes an SDT indication field. This SDT indication that is part of the reply may be in a new DCI message or may be a new field added to a legacy DCI message.

Figure 14:
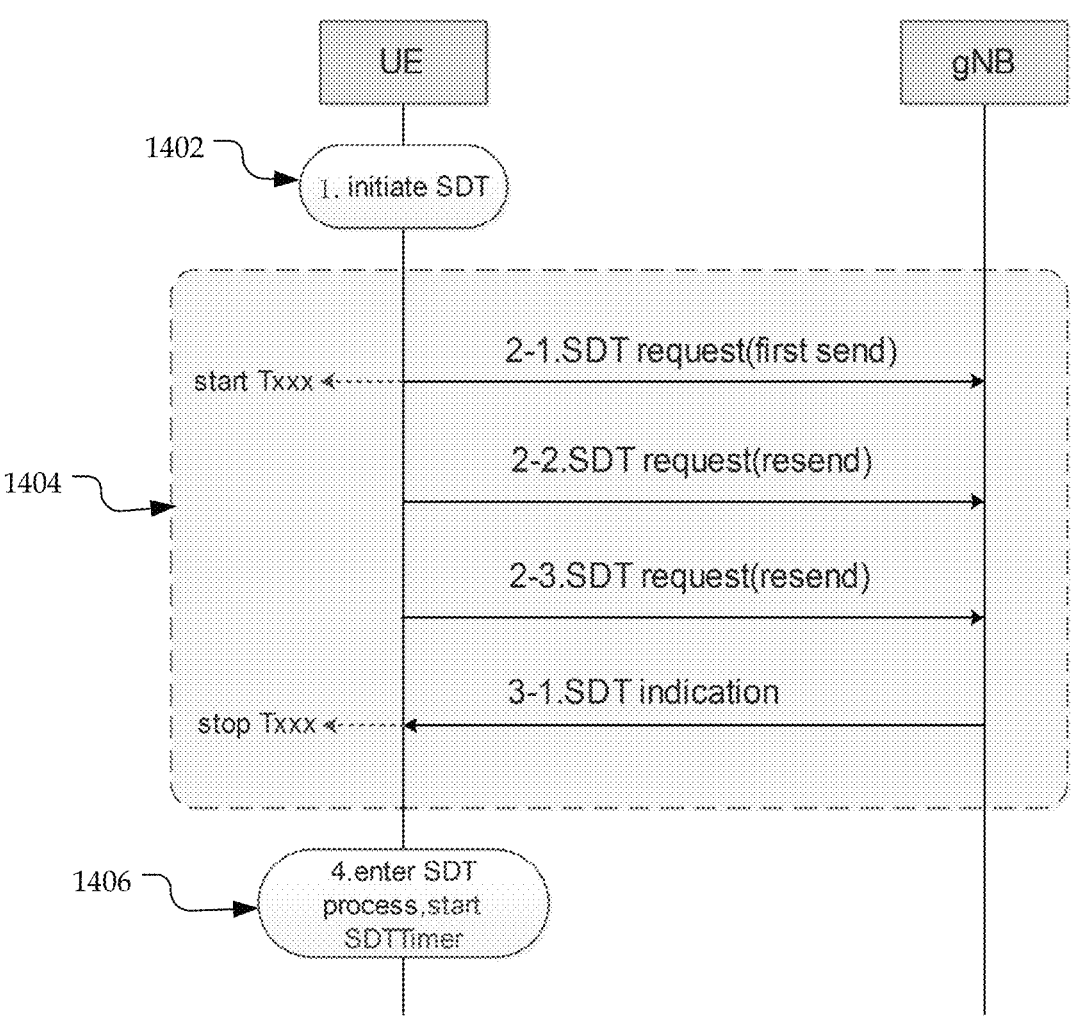
FIG. 14 shows a first example procedure for abnormal messaging.

FIG. 14 shows a first example procedure for abnormal messaging. The procedure in FIG. 14 corresponds with the procedure in FIG. 4, except the SDT request is sent multiple times. This procedure is referred to as abnormal because the reply is not sent until after the SDT request is sent three times. The SDT is initiated in block 1402 and in block 1404, the requests are sent. As shown in FIG. 14, the SDT request is send three times before receiving the SDT indication. When the SDT indication is received the timer is stopped. The SDT process is entered and the SDT timer is started in block 1406.

Figure 15:
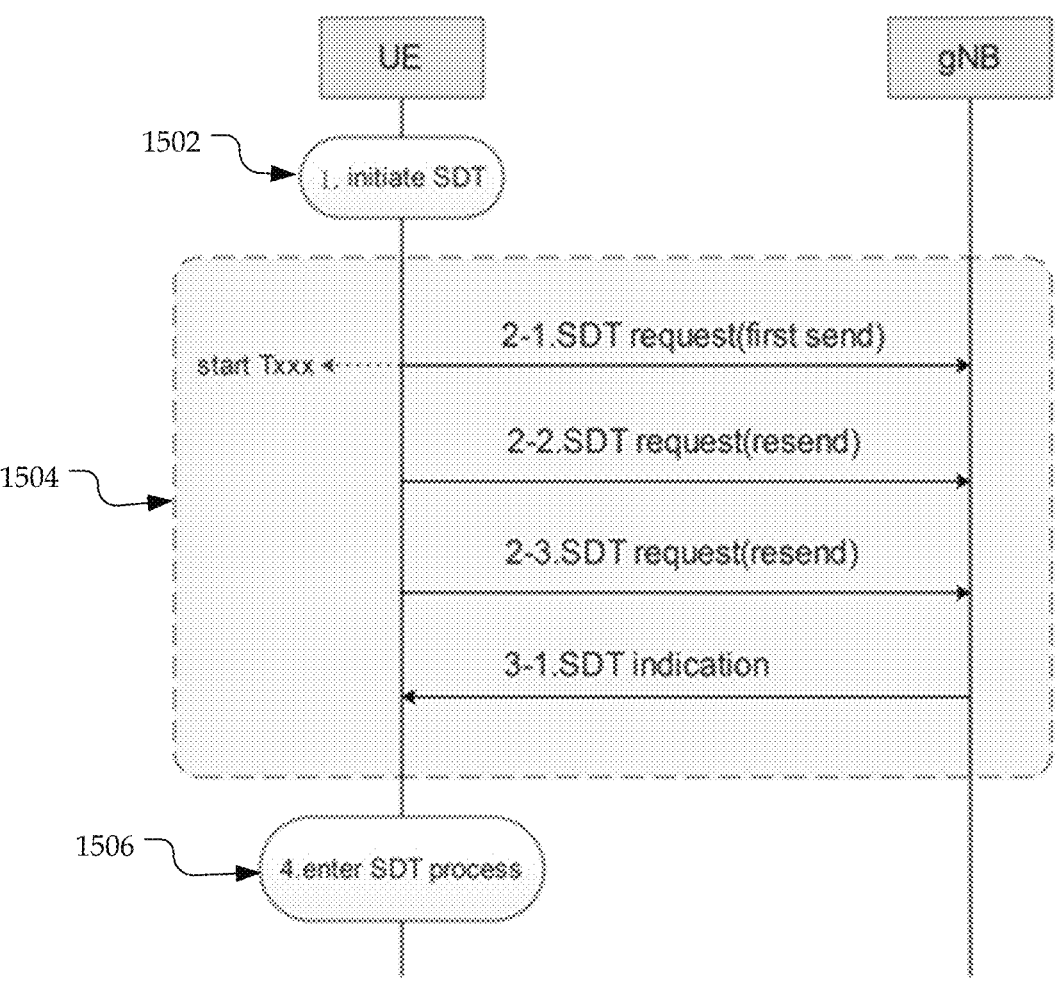
FIG. 15 shows a second example procedure for abnormal messaging.

FIG. 15 shows a second example procedure for abnormal messaging. The procedure in FIG. 15 corresponds with the procedure in FIG. 5, except the SDT request is sent multiple times. Specifically, FIG. 15 illustrates a single timer, while FIG. 14 included two timers. This procedure is referred to as abnormal because the reply is not sent until after the SDT request is sent three times. The SDT is initiated in block 1502 and in block 1504, the requests are sent. As shown in block 1504, the SDT request is send three times before receiving the SDT indication. The SDT process is entered in block 1506. As in FIG. 5, when the timer expires, the SDT process is stopped and the legacy inactive state is entered (not shown in FIG. 15).

In both FIG. 14 and FIG. 15, there are different resending approaches for RACH-based and CG-based schemes. For example, the RACH-based scheme may include the UE resending the SDT request via MSG3/MSGA. UE can resend MSG3/MSGA if not receiving MSG4/MSGB (including the SDT indication). For the CG-based scheme, the UE can resend the SDT request at a subsequent periodic point of CG PUSCH resources before receiving the SDT indication.

Figure 16:
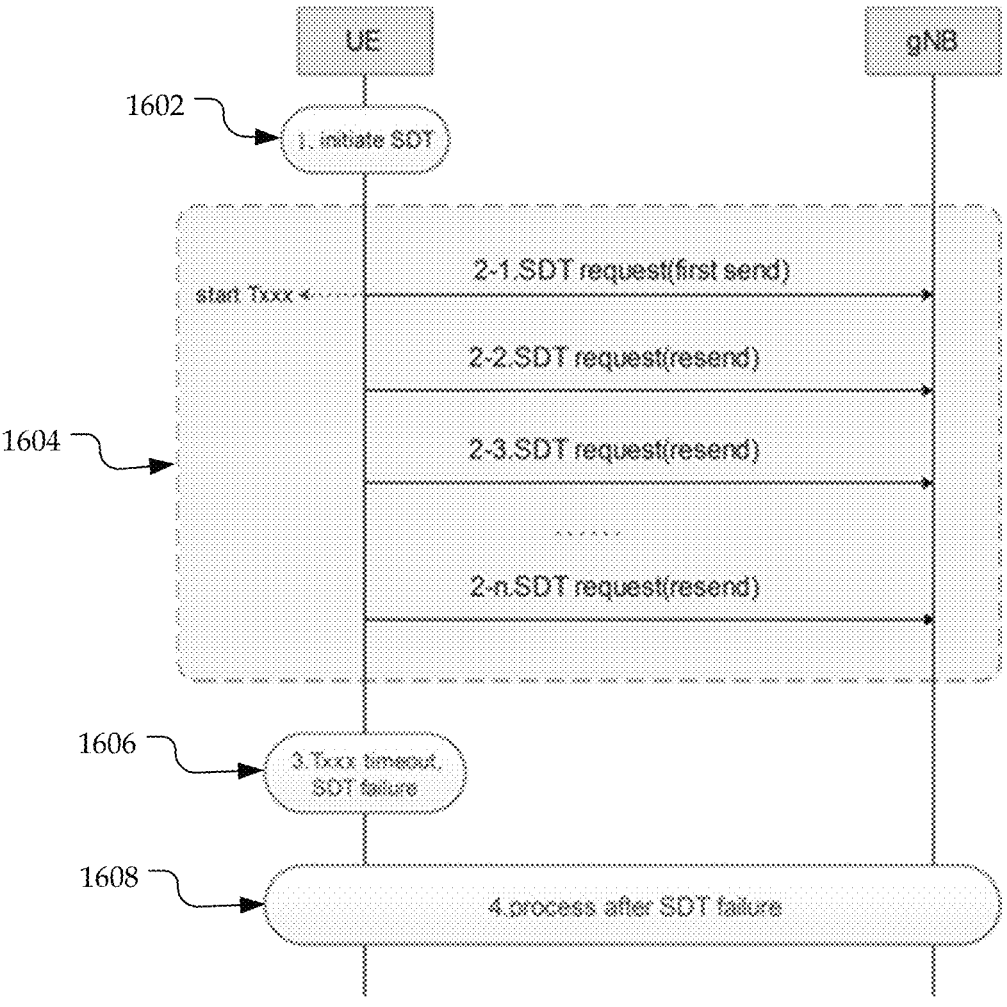
FIG. 16 shows a third example procedure for abnormal messaging.

FIG. 16 shows a third example procedure for abnormal messaging. In FIG. 16, the reply with the SDT indication is not received. The SDT is initiated in block 1602 and in block 1604, the requests are sent, but the reply is not received. The requests are resent in block 1604 until the timer expires in block 1606, which results in an SDT failure 1608. If UE can not receive a reply message before the timer expires, the UT thinks there is a SDT failure. After the failure in block 1608, the UE can process by 1) re-initiating SDT procedure after the timer (configure by the network), or 2) initiating legacy RRC resume procedure, or 3) initiate SDT procedure using RA resources (if the UE relied on CG resources).

Figure 17:
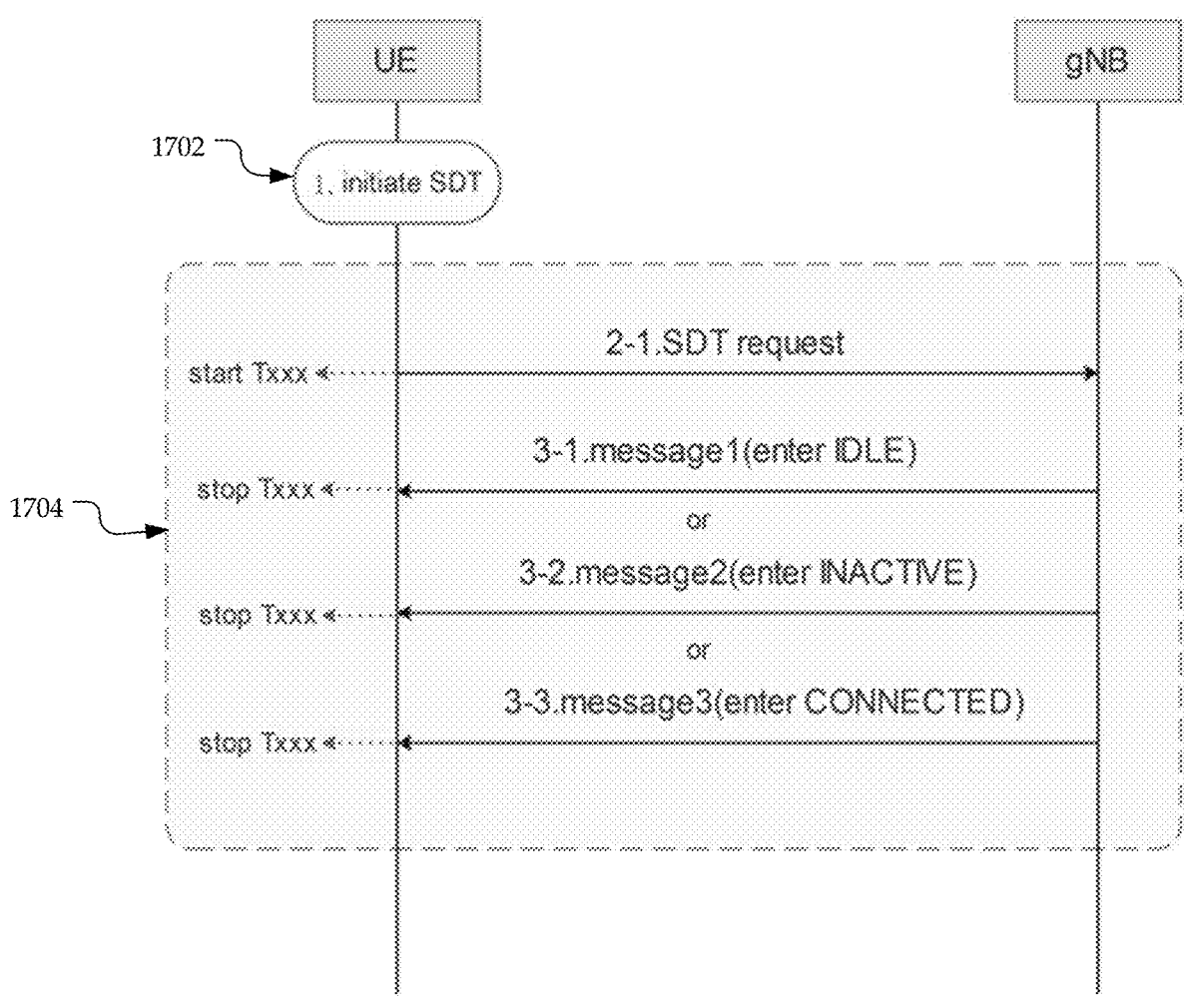
FIG. 17 shows a fourth example procedure for abnormal messaging.

FIG. 17 shows a fourth example procedure for abnormal messaging. The SDT is initiated in block 1502. In block 1504, the communications are abnormal because the basestation gNB sends other messages before the response (with the SDT indication) to the SDT request. The network can reply with different messages according to current network and UE conditions when receiving SDT request from UE. Message1/message2/message3 can be RRC signaling, MAC CE, or DCI. In one example, the UE sends SDT request via RRC-based solution, then network can reply with an RRC message to indicate UE to enter the idle state, the inactive state, or the connected state. In another example, the UE sends SDT request via RRC-less solution, then network can reply with a MAC CE to indicate UE to enter the idle state, the inactive state, or the connected state. This may introduce a new MAC CE. In yet another example, the UE sends an SDT request via RRC-less solution, then the network can reply with a DCI message to indicate UE to enter the idle state, the inactive state, or the connected state. This may introduce a new DCI, or introduce a new field to a legacy DCI.

Figure 18:
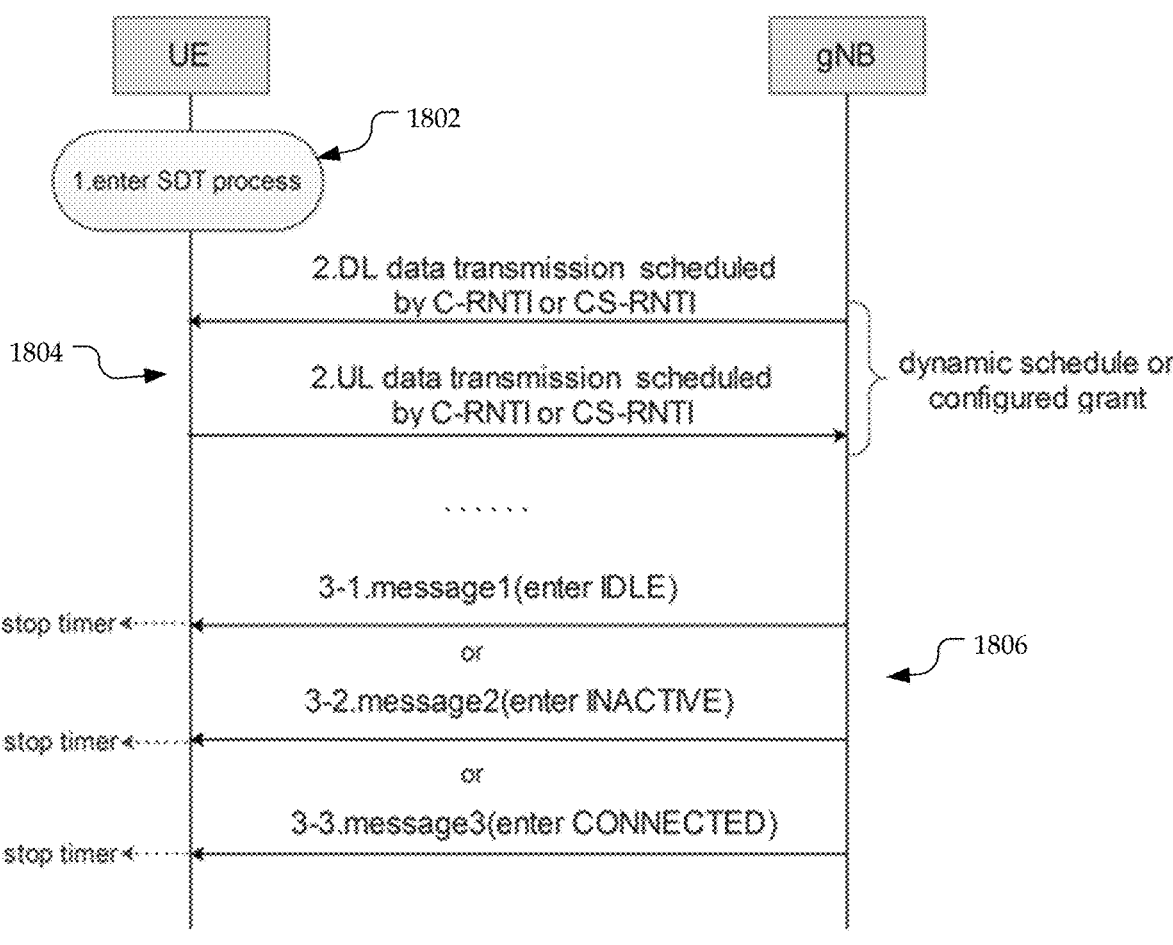
FIG. 18 shows a fifth example procedure for abnormal messaging.

FIG. 18 shows a fifth example procedure for abnormal messaging. FIG. 17 shows the SDT initiation phase while FIG. 18 shows the SDT process phase 1802. Similar to FIG. 17, there may be additional messages 1806 from the basestation gNB in response to the scheduling of data 1604. The messages 1606 may be the network sending a message to indicate UE to enter idle, inactive, or connected state according to current network and UE conditions. Message1/message2/message3 can be RRC signaling, MAC CE, or DCI.

Figure 19:
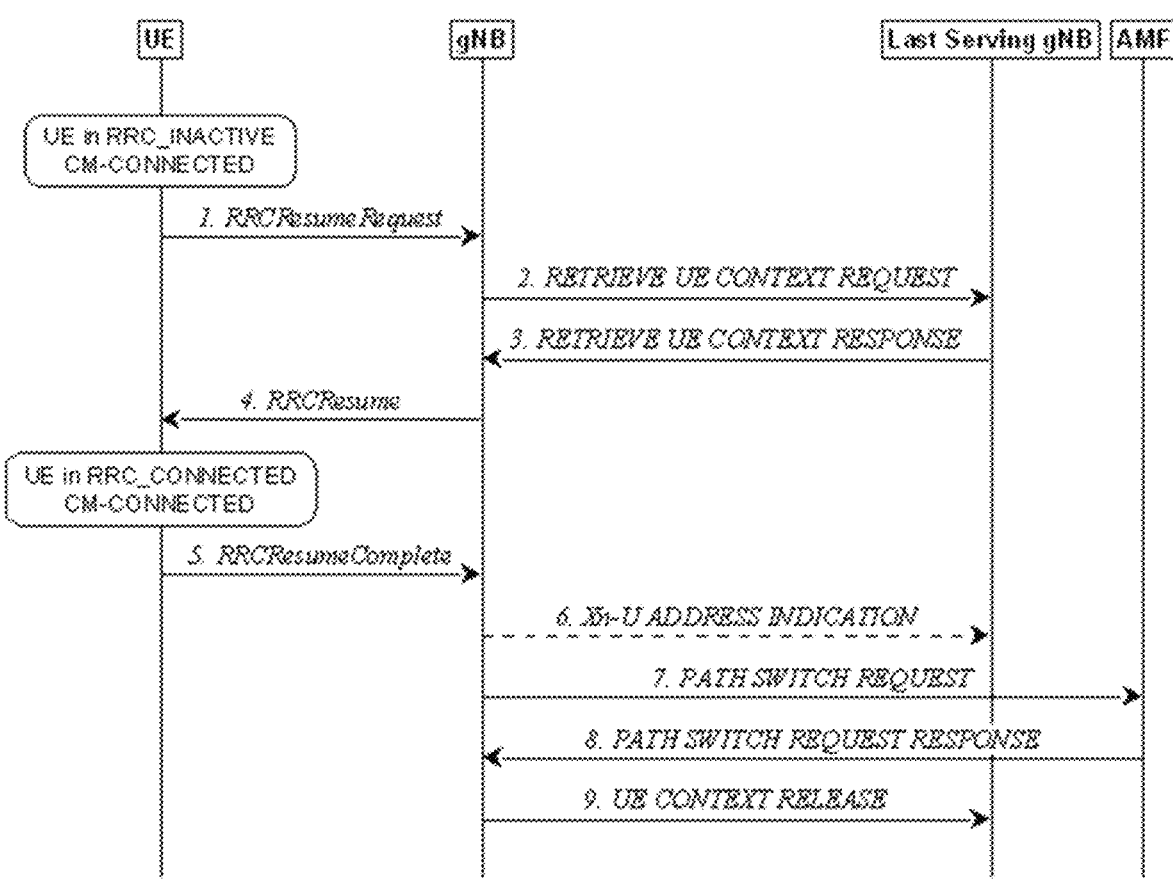
FIG. 19 shows an example anchor relocation communication.

FIG. 19 shows an example anchor relocation communications. An anchor basestation gNB may be referred to as the last serving gNB. The UE is in an inactive state. The UE issues a RRCResumeRequest to the gNB. The gNB retrieves UE context through a request to the last serving gNB (anchor gNB), which retrieves the UE context response. An RRCResume message is provided by the gNB to the UE. The UE is in a connected state and issues a RRCResumeComplete message to gNB. After path switch requests/responses, the UE context is released.

For the SDT procedure described above, the network can decide to relocate the anchor gNB or not relocate the anchor gNB when the SDT request is received at a different gNB (i.e. the current service gNB is not the last service gNB before entering an inactive state). When the network receives the SDT request in a different gNB, there are several alternatives, including: 1) the service gNB performs anchor relocation immediately; 2) the service gNB does not perform anchor relocation, and performs data forwarding; and 3) the service gNB does not perform anchor relocation, and performs data forwarding first, but then the service gNB performs anchor relocation when receiving a larger BSR above a threshold during small data transmission.

Anchor relocation can be triggered by the anchor node or the serving node. Serving node may include a node where the UE camped (e.g. the gNB of the cell where the UE camped) or the node (e.g. gNB) which has the RRC connection with UE, or the node in which the RRC message is received from UE in air interface. The anchor node may be the node where UE's SRB1 PDCP are located, or the node where UE's NG-C and/or NG-U connection is located or terminated. The anchor node may be the node where the UE context stored or the node from which the user data packet is forwarded to the core network.

There are different embodiments depending on which of the nodes triggers the anchor relocation. Considering the buffer status and radio condition of the UE can change, the serving gNB may determine to switch the UE from inactive state to connected state at any point of time during the SDT, based on the buffer status and radio condition on the UE side. Accordingly, the serving gNB can initiate the anchor relocation at any point of time including during the SDT procedure.

In one embodiment, when anchor relocation is triggered by the anchor node, the anchor node: 1) sends a first message to the serving node to request the anchor relocation; 2) receives a second message from the serving node that includes a container, which contains a RRC message (e.g. RRC resume or RRC reconfiguration or a newly defined RRC message); 3) performs ciphering and/or integrity protection for the RRC message included in the container; and 4) sends a third message to the serving node, in which a container is included which contains SRB PDCP PDU. The first message to the serving node to request the anchor relocation may be an XnAP message. The first message to the serving node to request the anchor relocation may include UE context, an anchor relocation indication, a transport address for data forwarding, a cause for anchor relocation, and/or security information, which can be used for security key generation in serving node and/or UE. The security information may include at least one of the following information: key-NG-RAN-Star, Ncc, and/or nextHop-ChainingCount. The second message may be an RRC message that includes at least the following information: keySetChangeIndicator and/or nextHopChainingCount. The SRB PDCP PDU in the third message may contain the security protected RRC message.

In an alternative embodiment, for the anchor relocation triggered by the anchor node, the following procedure may be utilized by the serving node. In a first step, the serving node receive the anchor relocation request from anchor node. In a second step, the serving node sends a message to the anchor node that includes a container with a RRC message (e.g. RRC resume or RRC reconfiguration or newly defined RRC message). In a third step, the serving node receives SRB PDCP PDU from the anchor node, and the serving node sends the SRB PDCP PDU to UE.

In another embodiment, when anchor relocation is triggered by the serving node, the serving node: 1) receives the security information from the anchor node that can be used for security key generation in serving node and/or UE; 2) sends a message to the anchor node that includes a container with a RRC message (e.g. RRC resume or RRC reconfiguration or newly defined RRC message); 3) receives a message from the anchor node including a container with a SRB PDCP PDU; and 4) sends the SRB PDCP PDU to UE. In step 1), the security information can be included in RetrieveUEContextResponse message, or a separate message. In step 2), an anchor relocation indication can be included in the message sent from serving node to anchor node. In step 3), in the RRC message, at least the following information may be included: keySetChangeIndicator and/or nextHopChainingCount. The security information may include at least one of key-NG-RAN-Star, Ncc, and/or nextHopChainingCount.

In an alternative embodiment, for the anchor relocation triggered by the serving node, the following procedure may be utilized by the anchor node. In step 1, the anchor node receives an anchor relocation request message from serving node that includes a container with a RRC message. In step 2, the anchor node performs ciphering and/or integrity protection for the RRC message included in the RRC container. In step 3, the anchor node sends the ciphered and/or integrity protected SRB PDCP PDU to the serving node. In step 3, the SRB PDCP PDU contains the RRC message received in Step 2. Before step 1, if there is no available security information in the serving node, the following procedure may be used to request the security information: 1) the serving node sends a first message to anchor node to request the anchor relocation (e.g. an anchor relocation indication can be included in the message); and 2) the serving node receives a second message from anchor node including the security information, which can be used to generate the security key used in serving node and/or UE.

Figure 20:
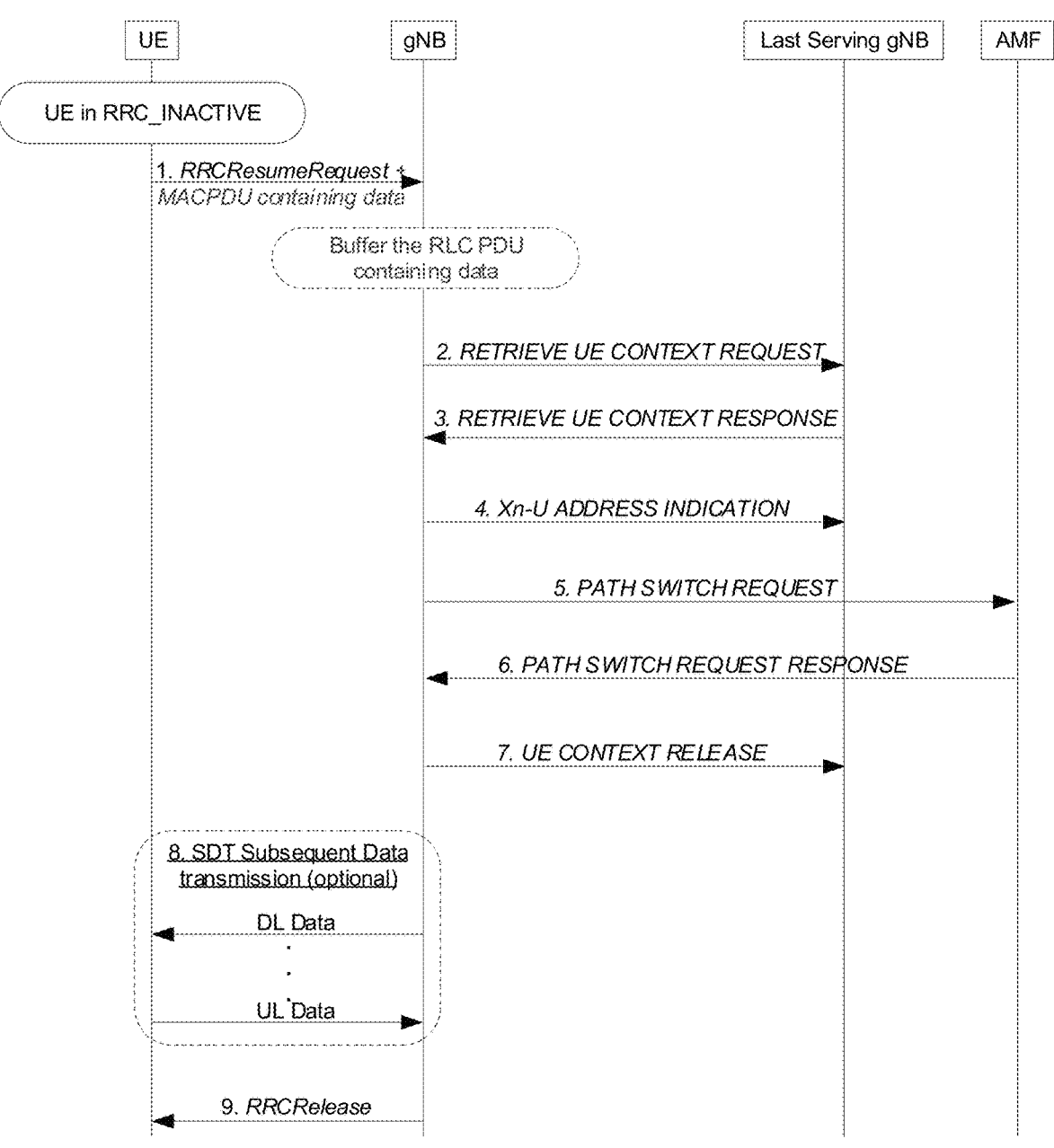
FIG. 20 shows another example anchor relocation communications.

FIG. 20 shows another example anchor relocation communications. Specifically, FIG. 20 illustrates an initialization of anchor relocation in new radio (NR) small data transmission (SDT). For SDT with anchor relocation, data may be included in the first uplink (UL) message as shown in FIG. 20 with the RRCResumeRequest message include MACPDU containing data. The target gNB may act as a first buffer ("buffer the radio link control (RLC) packet data unit (PDU) containing data") for the received data and then performs context fetch before proceeding to process the received UL data in the first UL message. Serving gNB (new anchor gNB) sends an RRCRelease message to the UE to end the SDT procedure. FIG. 20 illustrates optional subsequent data transmission (uplink and/or downlink). For anchor relocation, the serving gNB may become the new anchor gNB, perform a path switch procedure, and forward the data packet to CN after the path switch.

The invention claimed is:

1. A method for wireless communication, comprising:
   receiving, from a user equipment device, a request for a small data transmission, the user equipment device being in an inactive state;
   sending, to the user equipment device, a small data transmission indication in response to the request for the small data transmission, wherein the small data transmission indication comprises a downlink control information (DCI);
   processing the small data transmission; and
   configuring small data transmission parameters, via RRCRelease with SuspendConfig, which configure small data transmission resources, wherein the small data transmission resources are released based on the small data transmission parameters upon entry of an idle state for the user equipment device.

2. The method of claim 1,
   wherein the small data transmission resources are released based on the small data transmission parameters upon entry of a connected state for the user equipment device.

3. A method for wireless communication performed by a user equipment device, comprising:
   sending, while in an inactive state, a request for a small data transmission;
   in response to receiving a small data transmission indication in response to the request for the small data transmission, processing the small data transmission, wherein the small data transmission indication comprises a downlink control information (DCI);
   in response to not receiving the small data transmission indication, resending the request for the small data transmission; and
   releasing small data transmission resources based on small data transmission parameters upon entry of an idle state, wherein the small data transmission resources are configured by the small data transmission parameters via RRCRelease with SuspendConfig.

4. The method of claim 3, further comprising:
   releasing small data transmission resources based on small data transmission parameters upon entry of a connected state, wherein the small data transmission resources are configured by the small data transmission parameters via RRCRelease with SuspendConfig.

5. The method of claim 3, wherein the user equipment device is configured with a normal uplink carrier and a supplementary uplink carrier, and the user equipment device selects the supplementary uplink carrier based on a reference signals received power (RSRP) of downlink path loss reference being less than a first threshold.

6. A wireless communication apparatus, comprising:
   a memory operable to store computer-readable instructions; and
   a processor circuitry operable to read the computer-readable instructions, the processor circuitry when executing the computer-readable instructions is configured to:

receive, from a user equipment device, a request for a small data transmission, the user equipment device being in an inactive state;

send, to the user equipment device, a small data transmission indication in response to the request for the small data transmission, wherein the small data transmission indication comprises a downlink control information (DCI);

process the small data transmission; and configure small data transmission parameters, via RRCRelease with SuspendConfig, which configure small data transmission resources, wherein the small data transmission resources are released based on the small data transmission parameters upon entry of an idle state for the user equipment device.

7. The wireless communication apparatus of claim 6, wherein the small data transmission resources are released based on the small data transmission parameters upon entry of a connected state for the user equipment device.

8. A wireless communication apparatus, comprising:

a memory operable to store computer-readable instructions; and a processor circuitry operable to read the computer-readable instructions, the processor circuitry when executing the computer-readable instructions is configured to:

send, while in an inactive state, a request for a small data transmission;

in response to receiving a small data transmission indication in response to the request for the small data transmission, process the small data transmission, wherein the small data transmission indication comprises a downlink control information (DCI); and in response to not receiving the small data transmission indication, resend the request for the small data transmission;

release small data transmission resources based on small data transmission parameters upon entry of an idle state, wherein the small data transmission resources are configured by the small data transmission parameters via RRCRelease with SuspendConfig.

9. The wireless communication apparatus of claim 8, the processor circuitry is further configured to:

release small data transmission resources based on small data transmission parameters upon entry of a connected state, wherein the small data transmission resources are configured by the small data transmission parameters via RRCRelease with SuspendConfig.

10. The wireless communication apparatus of claim 8, wherein the wireless communication apparatus is configured with a normal uplink carrier and a supplementary uplink carrier, and the processor circuitry is further configured to select the supplementary uplink carrier based on a reference signals received power (RSRP) of downlink path loss reference being less than a first threshold.

\* \* \* \* \*